(12) United States Patent
Xu et al.

(10) Patent No.: US 11,372,195 B2
(45) Date of Patent: Jun. 28, 2022

(54) LENS MODULE

(71) Applicant: AAC Optics Solutions Pte. Ltd., Singapore (SG)

(72) Inventors: Tongming Xu, Shenzhen (CN); Houwei Zhao, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 106 days.

(21) Appl. No.: 16/984,168

(22) Filed: Aug. 4, 2020

(65) Prior Publication Data

US 2020/0379209 A1 Dec. 3, 2020

Related U.S. Application Data

(63) Continuation of application No. PCT/CN2019/089716, filed on Jun. 1, 2019.

(51) Int. Cl.
*G02B 7/09* (2021.01)
*G02B 27/64* (2006.01)

(52) U.S. Cl.
CPC ............. *G02B 7/09* (2013.01); *G02B 27/646* (2013.01)

(58) Field of Classification Search
None
See application file for complete search history.

(56) References Cited

U.S. PATENT DOCUMENTS

2015/0195459 A1\* 7/2015 Yeo .................. G02B 7/023
348/208.2
2018/0332199 A1\* 11/2018 Hu ..................... G02B 7/08

\* cited by examiner

*Primary Examiner* — Derek S. Chapel
(74) *Attorney, Agent, or Firm* — W&G Law Group (57) ABSTRACT

A lens module is provided. The lens module includes: a fixing frame; a lens assembly arranged in the fixing frame; an elastic suspending assembly connected between the fixing frame and the lens assembly to suspend the lens assembly within the fixing frame; a first magnet arranged on the lens assembly; a focusing coil arranged on the fixing frame and configured to cooperate with the first magnet to drive the lens assembly to move along an optical axis direction; a second magnet arranged on the lens assembly; and an anti-shake coil arranged on the fixing frame and configured to cooperate with the second magnet to drive the lens assembly to move along a second direction perpendicular to the optical axis to compensate for shaking of the lens assembly in a direction perpendicular to the optical axis. With the invention, the shaking of the lens assembly in the fixing frame is compensated.

10 Claims, 9 Drawing Sheets

LENS MODULE

TECHNICAL FIELD

The present invention relates to the technical field of optical imaging, in particular to a lens module applied in mobile electronic devices such as a cellphone.

BACKGROUND

With the development of the imaging technology and the emergence of the electronic products with imaging function, optical lenses are widely applied in various electronic products. Generally, the light is directly incident from the object side, and passes through the lens assembly along the optical axis to the image side, so that an image of the object is formed through the lens assembly. However, the lens assemblies in related art all have an autofocus function. During shooting, the focus driving assembly can drive the lens assembly to move along the optical axis relative to the fixing frame to take a clear image. However, in shooting situations where shaking occurs, the lens assembly will move slightly in a plane perpendicular to the optical axis, which seriously affects the sharpness of the image.

Therefore, it is necessary to provide an improved lens module to solve the problem in related art that the image captured by the lens assembly in a situation with shaking has a poor definition.

SUMMARY

The present invention provides a lens module capable of focusing and anti-shaking simultaneously.

An embodiment of the present invention provides a lens module. The lens module includes: a fixing frame; a lens assembly arranged in the fixing frame; an elastic suspending assembly connected between the fixing frame and the lens assembly to suspend the lens assembly within the fixing frame; at least one first magnet arranged on the lens assembly; at least one focusing coil arranged on the fixing frame and configured to cooperate with the at least one first magnet to drive the lens assembly to move along a first direction in which an optical axis extends; at least one second magnet arranged on the lens assembly; and at least one anti-shake coil arranged on the fixing frame and configured to cooperate with the at least one second magnet to drive the lens assembly to move along a second direction perpendicular to the optical axis to compensate for shaking of the lens assembly in a direction perpendicular to the optical axis.

As an improvement, the elastic suspending assembly includes a plurality of suspending members that is spaced apart from each other; each of the plurality of suspending members includes a top end, a bottom end that is opposite to the top end, and a deformation portion connected between the top end and the bottom end and extending in a direction perpendicular to both the first direction and the second direction; the top end is connected to the fixing frame, the bottom end is connected to the lens assembly, and the deformation portion is spaced apart from the lens assembly; the lens assembly includes an object-side wall, an image-side wall that is opposite to the object-side wall along the optical axis, a top wall, a bottom wall that is opposite to the top wall along a direction in which the deformation portion extends, and two extending walls each extending from the top wall to the bottom wall and connected between the object-side wall and the image-side wall; and the fixing frame has a light through hole opened towards the object-side wall.

As an improvement, the elastic suspending assembly further includes a plurality of first fixing blocks arranged on the top end and embedded in the fixing frame, and a plurality of second fixing blocks arranged on the bottom end and embedded in the lens assembly, the fixing frame is provided with receiving portions at positions corresponding to top ends of the plurality of suspending members, and the top ends are received in the receiving portions and fixed by the plurality of first fixing blocks.

As an improvement, the plurality of suspending members includes four suspending members, each of ends of the lens assembly respectively facing towards an object side and an image side is provided with two lugs at a side of the lens assembly facing away from the top end, and the bottom end of one of the four suspending members is embedded in one of the two lugs and fixed by one of the plurality of second fixing blocks.

As an improvement, the at least one first magnet includes two first magnets that are arranged on the two extending walls that are opposite to each other, respectively; the at least one second magnet includes two second magnets that are arranged on the top wall; the at least one focusing coil includes two focusing coils that are arranged at two sides of the fixing frame, respectively, and the two focusing coils face towards and are spaced apart from the two first magnets, respectively; and the at least one anti-shake coil includes two anti-shake coils that are arranged on the fixing frame, and the two anti-shake coils face towards and are spaced apart from the two second magnets, respectively.

As an improvement, the lens module further includes first magnetic conductive plates, second magnetic conductive plates, and at least one circuit board arranged on the fixing frame, each of the two focusing coils and the two anti-shake coils is connected to one of the at least one circuit board, each of the first magnetic conductive plates is arranged at a side of one of the two focusing coils facing away from one of the two first magnets facing towards the one focusing coil, to form a magnetic loop with the one first magnet, and each of the second magnetic conductive plates is arranged at a side of one of the two anti-shake coils facing away from one of the two second magnets facing towards the one anti-shake coil, to form a magnetic loop with the one second magnet.

As an improvement, the first magnetic conductive plate is arranged between the focusing coil and one of the at least one circuit board that is connected to the focusing coil or arranged at a side of the one circuit board facing away from the focusing coil; and the second magnetic conductive plate is arranged between the anti-shake coil and one of the at least one circuit board that is connected to the anti-shake coil or arranged at a side of the one circuit board facing away from the anti-shake coil.

As an improvement, each of the at least one circuit board includes a first connecting portion embedded within the fixing frame and a second connecting portion extending from the first connecting portion while being bent, the first connecting portion faces towards one of the two extending walls and is electrically connected to one of the two focusing coils, and the second connecting portion faces towards the top wall and is electrically connected to one of the two anti-shake coils.

As an improvement, the at least one circuit board includes two circuit boards that are located at two opposite sides of the lens assembly, respectively.

As an improvement, at least one of the two circuit boards further includes an extending board extending from a side of the first connecting portion facing away from the second connecting portion to outside of the fixing frame, and the extending board is electrically connected to an external circuit.

As an improvement, the lens module further includes a protective cover mounted on the fixing frame and covering at least one of the first connecting portion and the second connecting portion, and the at least one of the first connecting portion and the second connecting portion is at least partially exposed out of the fixing frame.

The present invention has the following beneficial effects. The elastic suspending assembly is provided between the fixing frame and the lens assembly to suspend the lens assembly in the fixing frame, and the focusing coil and the first magnet cooperate to drive the lens assembly to move along a direction in which the optical axis extends to realize auto focusing of the lens assembly in the fixing frame. In a case where shaking occurs, the lens assembly may move slightly in a plane perpendicular to the optical axis, and through the cooperation between the anti-shake coil and the second magnet, the lens assembly is driven to move in the direction perpendicular to the optical axis, which realizes the anti-shake compensation of the lens assembly in the fixing frame, thereby obtaining a clear imaging effect. The lens assembly is supported and suspended in the fixing frame by the elastic suspending assembly in both the focusing movement direction and the anti-shake compensation movement direction, which saves the internal space.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

In the figures: 1. Lens module; 10. Fixing frame; 11. Receiving portion; 12. Mounting hole; 13. Light through hole; 14. First perforation; 15. Second perforation; 20. Circuit board; 21. First connecting portion; 22. Second connecting portion; 23. Extending board; 30. Lens assembly; 31. Lens barrel; 311. Object-side wall; 312. Image-side wall; 313. Top wall; 314. Bottom wall; 315. Extending wall; 316. Lug; 317. Positioning hole; 318. First receiving groove; 319. Second receiving groove; 32. Lens; 40. Elastic suspending assembly; 41. Suspending member; 411. Top end; 412. Bottom end; 413. Deformation portion; 42. First fixing block; 43. Second fixing block; 50. First magnet; 60. Focusing coil; 70. Second magnet; 80. Anti-shake coil; 90. First magnetic conductive plate; 100. Second magnetic conductive plate; 200. Imaging sensor; 300. Protective cover.

DESCRIPTION OF EMBODIMENTS

The present invention is described in detail below with reference to the accompanying drawings and embodiments.

It should be noted that all directional indications (such as up, down, in, out, top, bottom . . . ) in the embodiments of the present invention are only used to explain relative positional relationship of various components under a specific posture (as shown in the drawings), and if the specific posture changes, the directional indications also change accordingly.

In addition, when it is referred that an element is "fixed to" or "arranged on" another element, the element can be directly fixed to or arranged on another element or through an intermediate element arranged between the element and another element. When it is referred that an element is "connected to" another element, the element can be directly connected to another element or through an intermediate element arranged between the element and another element.

As shown in FIG. 1 to FIG. 9, an embodiment of the present invention provides a lens module 1. The lens module 1 includes a fixing frame 10, a circuit board 20, a lens assembly 30, an elastic suspending assembly 40, a first magnet 50, a focusing coil 60, a second magnet 70, and an anti-shake coil 80. The circuit board 20 is installed on the fixing frame 10, both the focusing coil 60 and the anti-shake coil 80 are electrically connected to the circuit board 20, and the lens assembly 30 is disposed in the fixing frame 10. The elastic suspending assembly 40 is connected between the fixing frame 10 and the lens assembly 30 to suspend the lens assembly 30 in the fixing frame 10, so that the lens assembly 30 is in a suspended state in the fixing frame 10. The first magnet 50 is provided on the lens assembly 30, and the focusing coil 60 is provided on the fixing frame 10 and is configured to cooperate with the first magnet 50 to drive the lens assembly 30 to move along a first direction in which an optical axis extends, i.e., to move along a length direction of the fixing frame 10, to realize auto focusing of the lens assembly 30 in the fixing frame 10. The second magnet 70 is provided on the lens assembly 30, and the anti-shake coil 80 is provided on the fixing frame 10 and cooperates with the second magnet 70. The anti-shake coil 80 is configured to drive the lens assembly 30 to move in a second direction perpendicular to the optical axis, i.e., to move in a width direction of the fixing frame 10, to compensate the shaking of the lens assembly 30 in the direction perpendicular to the optical axis. In a specific application, in a shooting situation where shaking occurs, the lens assembly 30 may move slightly in a plane perpendicular to the optical axis. At this time, the anti-shake coil 80 and the second magnet 70 cooperate to drive the lens assembly 30 to make an opposite movement to compensate the shaking amount, thereby obtaining high-definition images.

Figure 4:
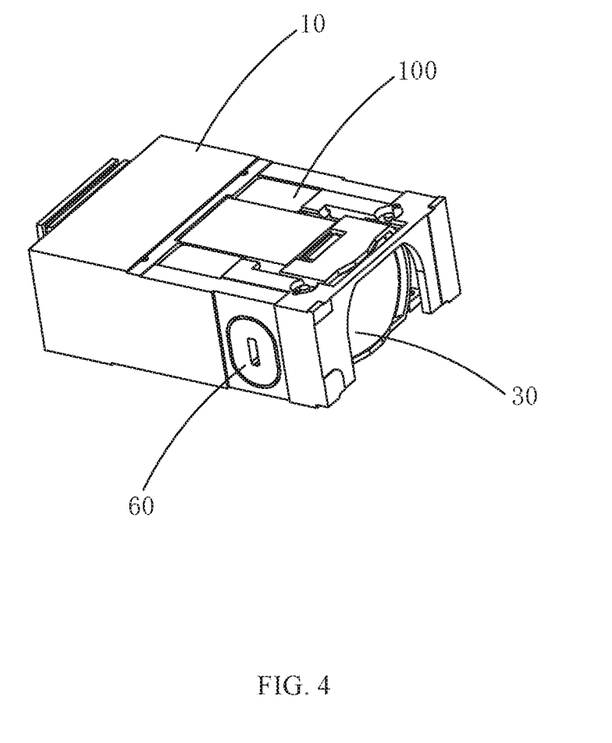
FIG. 4 is a three-dimensional diagram of a lens module with the protective cover, circuit board and first magnetic conductive plate removed.
Figure 5:
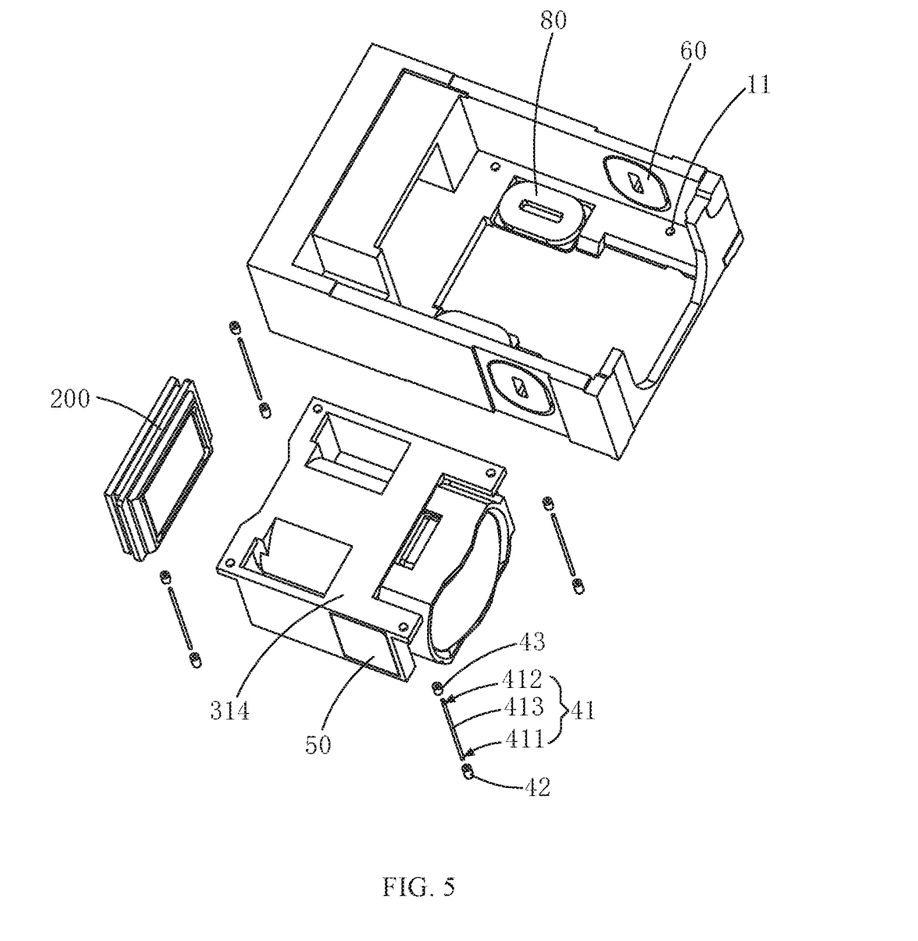
FIG. 5 is an exploded schematic diagram of FIG. 4.
Figure 9:
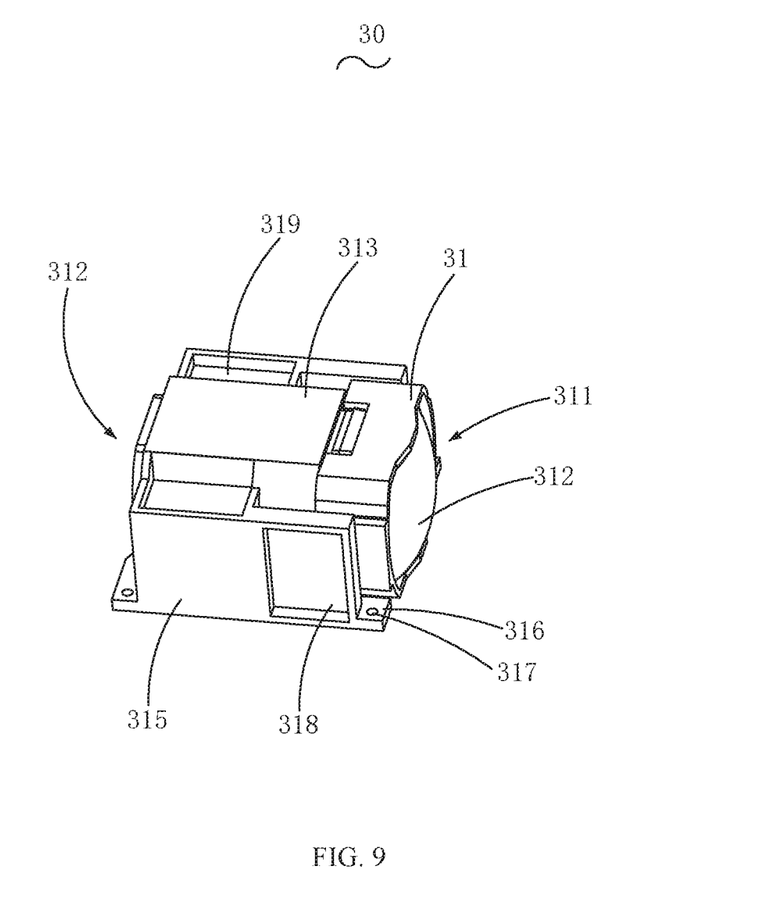
FIG. 9 is a three-dimensional view of a lens module according to an embodiment of the present invention.

Referring to FIG. 4, FIG. 5, and FIG. 9, the lens assembly 30 includes an object-side wall 311, an image-side wall 312, a top wall 313, a bottom wall 314, and extending walls 315. The object-side wall 311 and the image-side wall 312 are opposite to each other along the optical axis. The top wall 313 and the bottom wall 314 are opposite to each other along a height direction of the fixing frame 10, the extending wall 315 extends from the top wall 313 to the bottom wall 314, and the extending wall 315 is connected between the object-side wall 311 and the image-side wall 312. In an embodiment, two first magnets 50, two focusing coils 60, two second magnets 70 and two anti-shake coils 80 are included. The two first magnets 50 are installed on two extending walls 315, facing away from each other, of the lens assembly 30, respectively. The two focusing coils 60 are disposed on two sides of the fixing frame 10, respectively. The two focusing coils 60 face towards and are spaced apart from the two first magnets 50, respectively. The focusing coils 60 cooperates with the first magnets 50 to drive the lens assembly 30 to move more smoothly along the first direction in which the optical axis extends.

The two second magnets 70 are both installed on the top wall 313 of the lens assembly 30, and the two anti-shake coils 80 are both provided on the fixing frame 10. The two anti-shake coils 80 face towards and are spaced apart from the two first magnets 70, respectively. The anti-shake coils 80 and the second magnets 70 cooperate to drive the lens assembly 30 to move more smoothly in the second direction perpendicular to the optical axis.

Referring further to FIG. 2, FIG. 3, and FIG. 5 to FIG. 7, in an embodiment, the elastic suspending assembly 40 includes multiple suspending members 41 that are spaced apart from each other, and each suspending member 41 includes a top end 411, a bottom end 412, and a deformation portion 413. The top end 411 and the bottom end 412 are opposite to each other, and the deformation portion 413 is connected between the top end 411 and the bottom end 412. The deformation portion 413 extends in a direction perpendicular to both the first direction and the second direction. The top end 411 is connected to the fixing frame 10 and the bottom end 412 is connected to the lens assembly 30, to suspend the lens assembly 30 in the fixing frame 10. The lens assembly 30 and the deformation portion 413 are spaced apart from each other. In an embodiment, the deformation portion 413 is made of a metal material, such as an alloy material. In an embodiment, the alloy material is a copper alloy, such as beryllium copper. It should be noted that when the lens assembly 30 is suspended, it can only move in a horizontal direction without moving in a vertical direction.

In an embodiment, the elastic suspending assembly 40 further includes multiple first fixing blocks 42 disposed on the top end 411 and all embedded within the fixing frame 10 and multiple second fixing blocks 43 disposed on the bottom end 412 and all embedded within the lens assembly 30. In an embodiment, four suspending members 41 are included, the lens assembly 30 includes a lens barrel 31 and multiple lenses 32 located in the lens barrel 31. The lens barrel 31 is of a square structure, and each suspending member 41 corresponds to one first fixing block 42 and one second fixing block 43. Each of ends of the lens assembly 30 respectively facing towards an object side and an image side is provided with two lugs 316 at a side of the lens assembly 30 facing away from the top end 411. The fixing frame 10 is provided with multiple receiving portions 11 at positions corresponding to the top ends 411, the top end 411 of each suspending member 41 is respectively received in one receiving portion 11 and fixed by a corresponding first fixing block 42. Positioning holes 317 are correspondingly provided in the lugs 316. The bottom ends 412 of the suspending members 41 are embedded in the positioning holes 317 of the lugs 316 in one-to-one correspondence and fixed by corresponding second fixing blocks 43, to fix the suspending members 41 between the lens assembly 30 and the fixing frame 10. The number and distribution of the suspending members 41 are not limited here.

Figure 6:
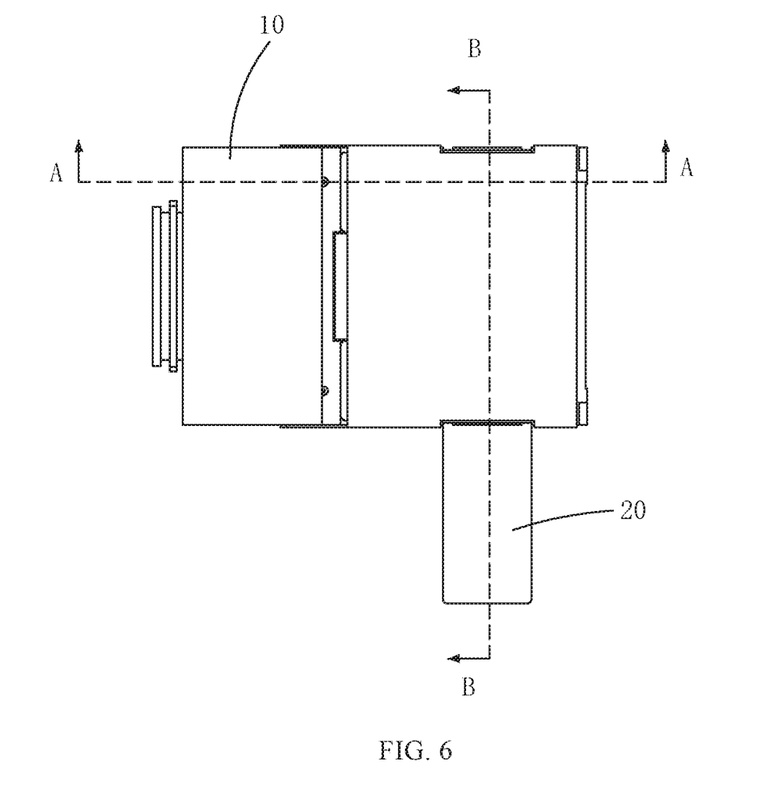
FIG. 6 is a top view of a lens module according to an embodiment of the present invention.
Figure 7:
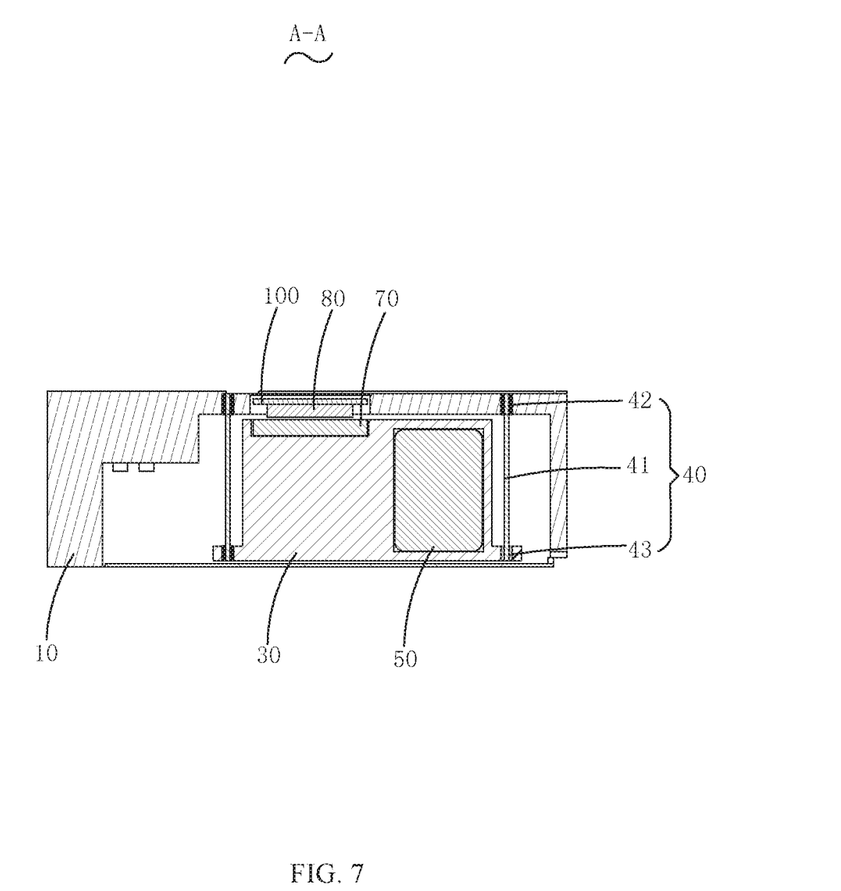
FIG. 7 is a sectional view of FIG. 6 taken along line A-A.
Figure 8:
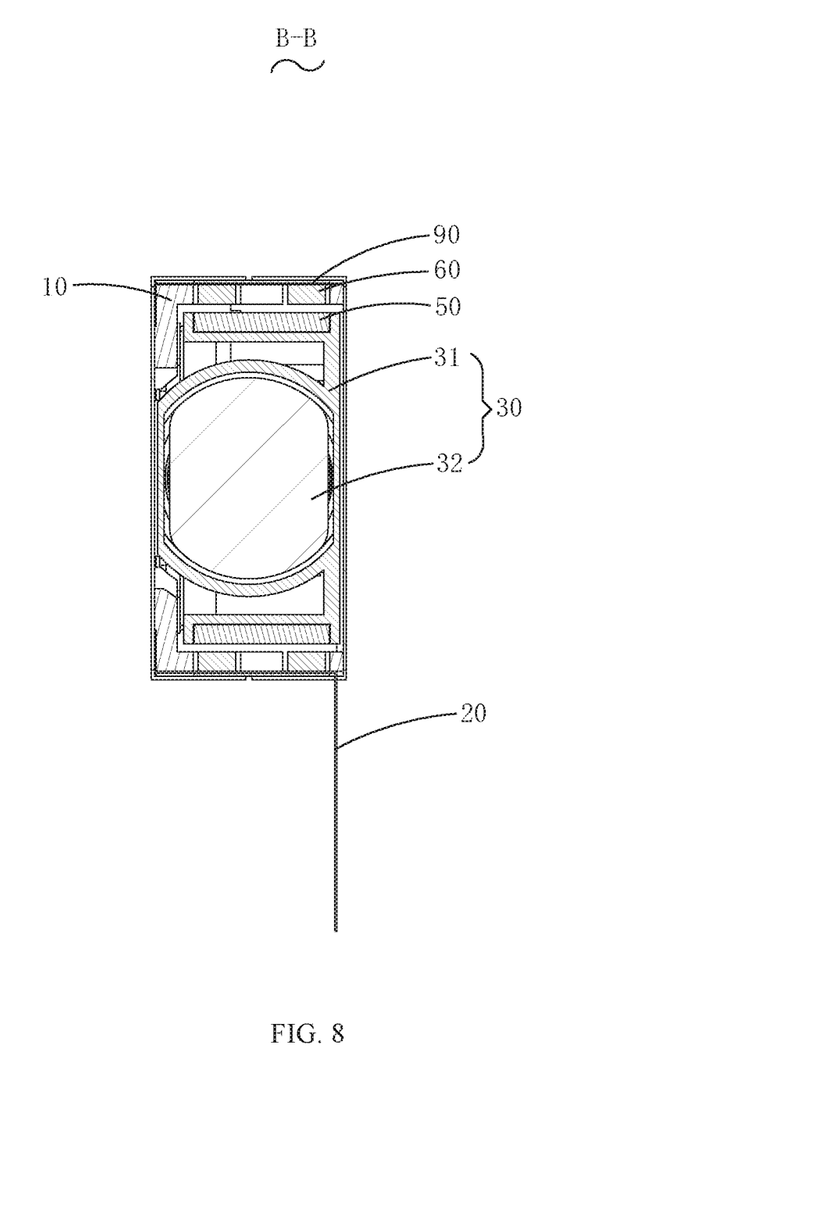
FIG. 8 is a sectional view of FIG. 6 taken along line B-B.

With reference to FIG. 6 to FIG. 8, the lens module 1 further includes a first magnetic conductive plate 90 and a second magnetic conductive plate 100. The first magnetic conductive plate 90 is mounted on the circuit board 20, and is at a side of the focusing coil 60 away from the first magnet 50. The first magnetic conducting plate 90 may be arranged between the focusing coil 60 and the circuit board 20 or arranged at a side of the circuit board 20 facing away from the focusing coil 60 to form a magnetic loop with the first magnet 50 to enhance a magnetic strength of the first magnet 50. In this embodiment, the first magnetic conductive plate 90 is disposed at the side of the circuit board 20 facing away from the focusing coil 60.

The second magnetic conductive plate 100 is also installed on the circuit board 20. The second magnetic conductive plate 100 is disposed at a side of the anti-shake coil 80 facing away from the second magnet 70. The second magnetic conductive plate 100 may be arranged between the anti-shake coil 80 and the circuit board 20 or arranged at a side of the circuit board 20 facing away from the anti-shake coil 80 to form a magnetic loop with the second magnet 70 to enhance a magnetic strength of the second magnet 70. In this embodiment, the second magnetic conductive plate 100 is arranged between the anti-shake coil 80 and the circuit board 20.

In an embodiment, two circuit boards 20 are included. The two circuit boards 20 are electrically connected to each other, and are located at two opposite sides of the lens assembly 30, respectively. One focusing coil 60, one first magnetic conductive plate 90, one anti-shake coil 80 and one second magnetic conductive plate 100 are connected to one of the two circuit boards 20, and another focusing coil 60, another first magnetic conductive plate 90, another anti-shake coil 80 and another second magnetic conductive plate 100 are connected to another one of the two circuit boards 20, realizing fixation of the respective driving coils and the magnetic conductive plates.

In an embodiment, the circuit board 20 includes a first connecting portion 21 embedded in the fixing frame 10 and a second connecting portion 22 extending from the first connecting portion 21 while being bent. The first connecting portion 21 faces towards the extending wall 315 and is electrically connected to the focusing coil 60, and the second connecting portion 22 faces towards the top wall 313 and is electrically connected to the anti-shake coil 80. In an embodiment, at least one circuit board 20 further includes an extending board 23 extending from a side of the first connecting portion 21 facing away from the second connecting portion 22 to an exterior of the fixing frame 10, and the extending board 23 is electrically connected to an external circuit.

Figure 1:
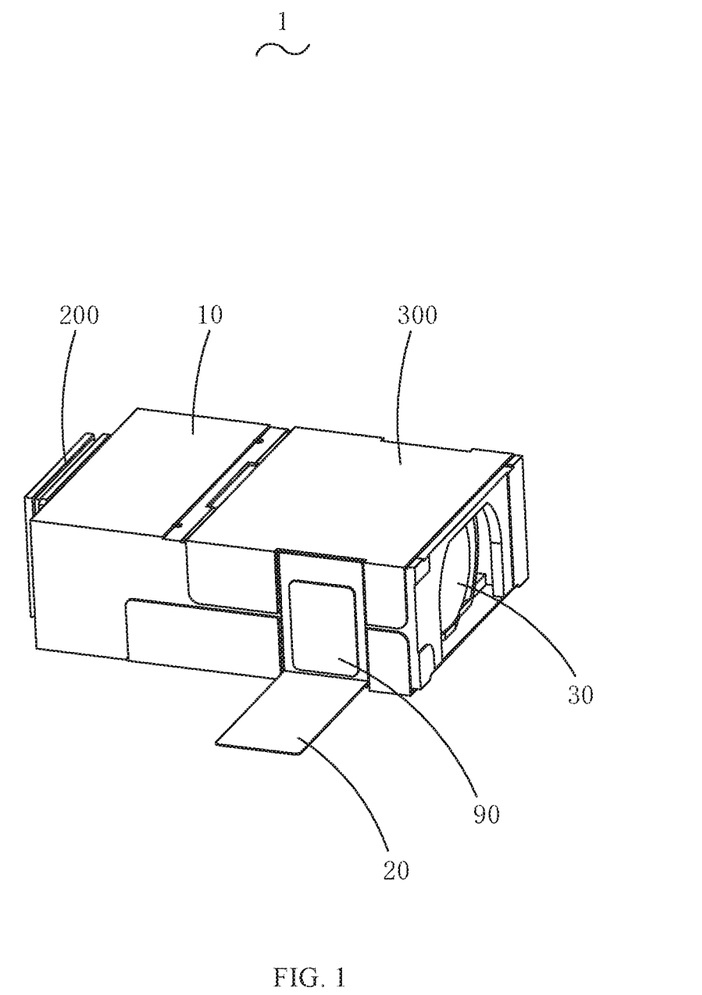
FIG. 1 is a three-dimensional diagram of a lens module according to an embodiment of the present invention.
Figure 2:
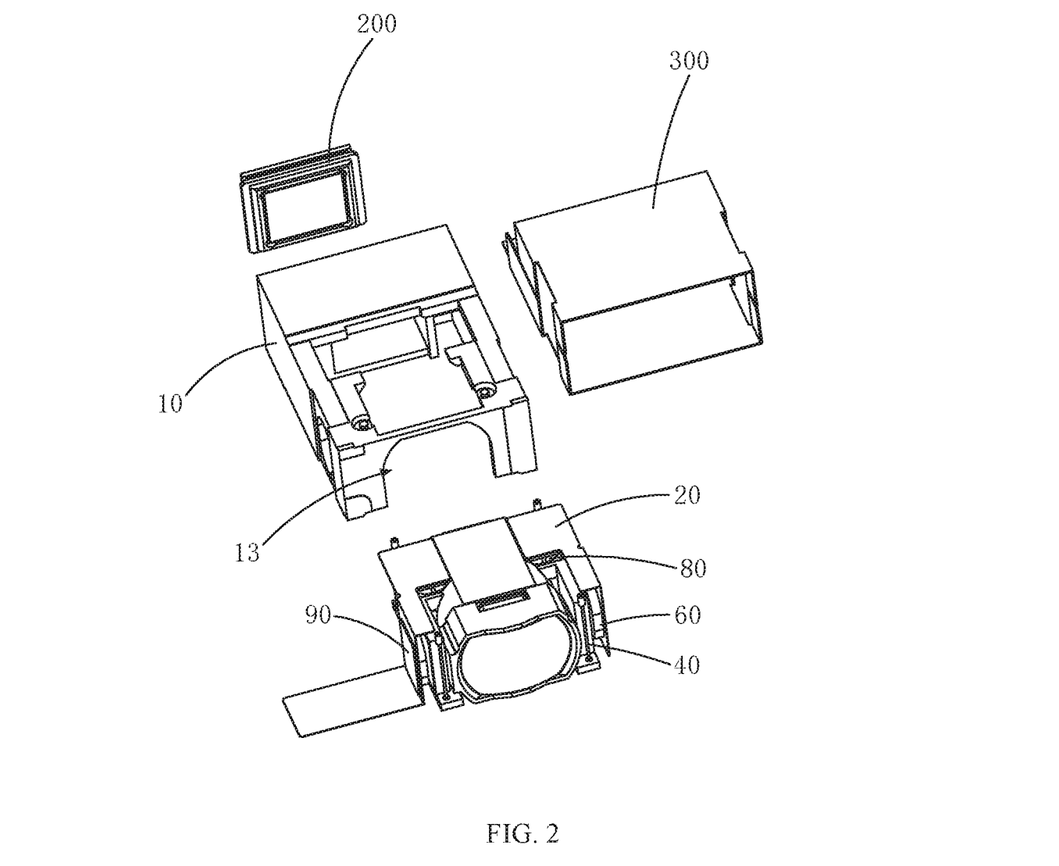
FIG. 2 is an exploded schematic diagram of FIG. 1.
Figure 3:
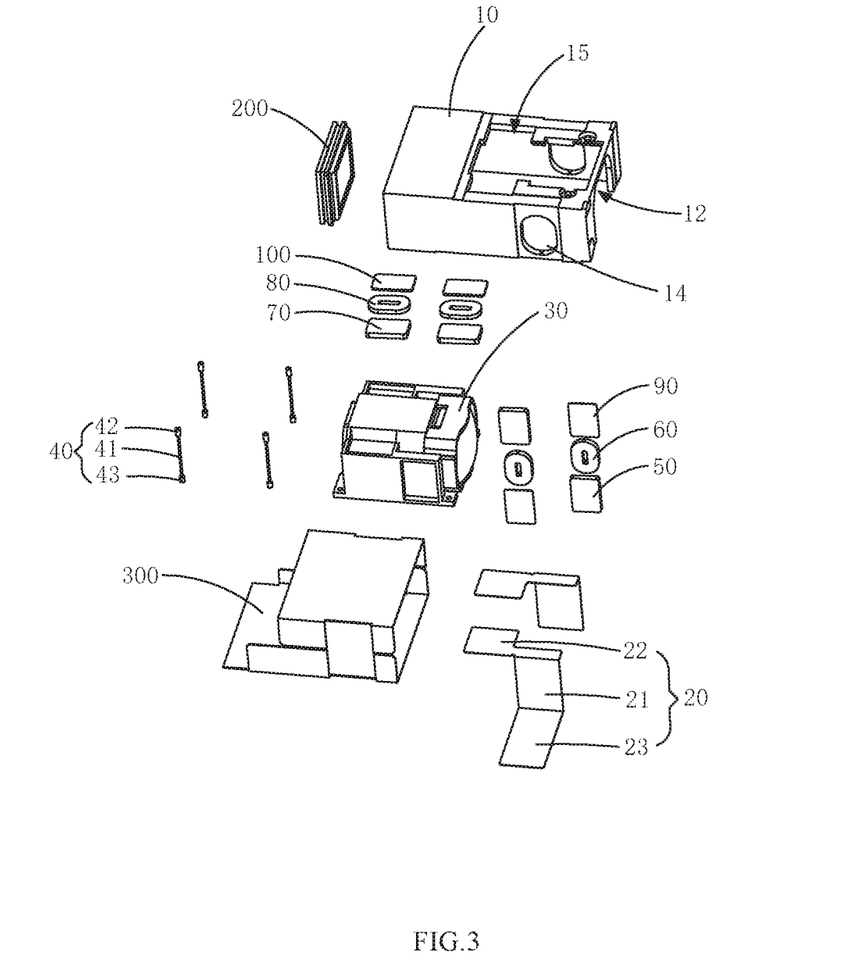
FIG. 3 is another exploded schematic diagram of FIG. 1.

Referring to FIG. 2, FIG. 3 and FIG. 9, the fixing frame 10 has a mounting hole 12 for the lens assembly 30 to pass through, a light through hole 13 facing towards the object-side wall 311 and communicating with the mounting hole 12, a first perforation 14 communicating with the mounting hole 12 and located on a lateral side of the fixing frame 10 for the focusing coil 60 to pass through, and a second perforation 15 communicating with the mounting hole 12 and located on top of the fixing frame 10 for the anti-shake coil 80 to pass through. The lens barrel 31 is correspondingly provided with a first receiving groove 318 for fixing the first magnet 50 and a second receiving groove 319 for fixing the second magnet 70. The focusing coil 60 in this embodiment is fixed to the circuit board 20 and cooperates with the first magnet 50 located in the first receiving groove 318 through the first perforation 14 to generate a force for driving the lens assembly 30 to move along the optical axis. The anti-shake coil 80 is fixed to the circuit board 20 and cooperates with the second magnet 70 located in the second receiving groove 319 through the second perforation 15 to generate a force for driving the lens assembly 30 to move in the direction perpendicular to the optical axis. At least one of the first connecting portion 21 and the second connecting portion 22 is at least partially exposed out of the fixing frame 10.

In an embodiment, the lens module 1 further includes an imaging sensor 200 and multiple protective covers 300. The imaging sensor 200 is detachably mounted on an end of the fixing frame 10 close to the image side of the lens assembly 30. Light reaches the imaging sensor 200 through the lens assembly 30 and is imaged on the imaging sensor 200. The protective covers 300 are mounted on the fixing frame 10 and cover at least one of the first connecting portion 21 and the second connecting portion 22 of the circuit board 20 to prevent external light from directly entering the lens assembly 30.

It should be noted that, the above are merely embodiments of the present invention, those skilled in the art can make improvements without departing from the inventive concept of the present invention, and these improvements shall belong to the protection scope of the present invention.

What is claimed is:

1. A lens module, comprising:
a fixing frame;
a lens assembly arranged in the fixing frame;
an elastic suspending assembly connected between the fixing frame and the lens assembly to suspend the lens assembly within the fixing frame;
at least one first magnet arranged on the lens assembly;
at least one focusing coil arranged on the fixing frame and configured to cooperate with the at least one first magnet to drive the lens assembly to move along a first direction in which an optical axis extends;
at least one second magnet arranged on the lens assembly; and
at least one anti-shake coil arranged on the fixing frame and configured to cooperate with the at least one second magnet to drive the lens assembly to move along a second direction perpendicular to the optical axis to compensate for shaking of the lens assembly in a direction perpendicular to the optical axis;
wherein the elastic suspending assembly comprises a plurality of suspending members that is spaced apart from each other, wherein each of the plurality of suspending members comprises a top end, a bottom end that is opposite to the top end, and a deformation portion connected between the top end and the bottom end and extending in a direction perpendicular to both the first direction and the second direction, wherein the top end is connected to the fixing frame, the bottom end is connected to the lens assembly, and the deformation portion is spaced apart from the lens assembly,
wherein the lens assembly comprises and object-side wall, an image-side wall that is opposite to the object-side wall along the optical axis, a top wall, a bottom wall that is opposite to the top wall along a direction in which the deformation portion extends, and two extending walls each extending from the top wall to the bottom wall and connected between the object-side wall and the image-side wall, and
wherein the fixing frame has a light through hole opened towards the object-side wall.

2. The lens module as described in claim 1, wherein the elastic suspending assembly further comprises a plurality of first fixing blocks arranged on the top end and embedded in the fixing frame, and a plurality of second fixing blocks arranged on the bottom end and embedded in the lens assembly, the fixing frame is provided with receiving portions at positions corresponding to top ends of the plurality of suspending members, and the top ends are received in the receiving portions and fixed by the plurality of first fixing blocks.

3. The lens module as described in claim 2, wherein the plurality of suspending members comprises four suspending members, each of ends of the lens assembly respectively facing towards an object side and an image side is provided with two lugs at a side of the lens assembly facing away from the top end, and the bottom end of one of the four suspending members is embedded in one of the two lugs and fixed by one of the plurality of second fixing blocks.

4. The lens module as described in claim 1, wherein the at least one first magnet comprises two first magnets that are arranged on the two extending walls that are opposite to each other, respectively;
the at least one second magnet comprises two second magnets that are arranged on the top wall;
the at least one focusing coil comprises two focusing coils that are arranged at two sides of the fixing frame, respectively, and the two focusing coils face towards and are spaced apart from the two first magnets, respectively; and
the at least one anti-shake coil comprises two anti-shake coils that are arranged on the fixing frame, and the two anti-shake coils face towards and are spaced apart from the two second magnets, respectively.

5. The lens module as described in claim 4, further comprising:
first magnetic conductive plates, second magnetic conductive plates, and at least one circuit board arranged on the fixing frame,
wherein each of the two focusing coils and the two anti-shake coils is connected to one of the at least one circuit board,
wherein each of the first magnetic conductive plates is arranged at a side of one of the two focusing coils facing away from one of the two first magnets facing towards the one focusing coil, to form a magnetic loop with the one first magnet, and
wherein each of the second magnetic conductive plates is arranged at a side of one of the two anti-shake coils facing away from one of the two second magnets facing towards the one anti-shake coil, to form a magnetic loop with the one second magnet.

6. The lens module as described in claim 5, wherein the first magnetic conductive plate is arranged between the focusing coil and one of the at least one circuit board that is connected to the focusing coil or arranged at a side of the one circuit board facing away from the focusing coil; and
the second magnetic conductive plate is arranged between the anti-shake coil and one of the at least one circuit board that is connected to the anti-shake coil or arranged at a side of the one circuit board facing away from the anti-shake coil.

7. The lens module as described in claim 5, wherein each of the at least one circuit board comprises a first connecting portion embedded within the fixing frame and a second connecting portion extending from the first connecting portion while being bent, wherein the first connecting portion faces towards one of the two extending walls and is electrically connected to one of the two focusing coils, and the second connecting portion faces towards the top wall and is electrically connected to one of the two anti-shake coils.

8. The lens module as described in claim 7, wherein the at least one circuit board comprises two circuit boards that are located at two opposite sides of the lens assembly, respectively.

9. The lens module as described in claim 8, wherein at least one of the two circuit boards further comprises an extending board extending from a side of the first connecting portion facing away from the second connecting portion to outside of the fixing frame, and the extending board is electrically connected to an external circuit.

10. The lens module as described in claim 7, further comprising:
   a protective cover mounted on the fixing frame and covering at least one of the first connecting portion and the second connecting portion, wherein the at least one of the first connecting portion and the second connecting portion is at least partially exposed out of the fixing frame.

* * * * *